United States Patent
Uchiyama

(10) Patent No.: US 9,699,342 B2
(45) Date of Patent: Jul. 4, 2017

(54) IMAGE READING DEVICE AND IMAGE FORMING DEVICE FOR DETECTING PRESENCE OF DUST ON A READING POSITION

(71) Applicant: FUJI XEROX CO., LTD., Tokyo (JP)

(72) Inventor: Keisuke Uchiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/719,478

(22) Filed: May 22, 2015

(65) Prior Publication Data
US 2016/0142573 A1    May 19, 2016

(30) Foreign Application Priority Data
Nov. 18, 2014    (JP) .................................. 2014-233910

(51) Int. Cl.
*H04N 1/00*    (2006.01)
*H04N 1/028*    (2006.01)

(52) U.S. Cl.
CPC ....... *H04N 1/00824* (2013.01); *H04N 1/0057* (2013.01); *H04N 1/00909* (2013.01); *H04N 1/00925* (2013.01); *H04N 1/02895* (2013.01)

(58) Field of Classification Search
None
See application file for complete search history.

(56) References Cited

U.S. PATENT DOCUMENTS

| | | | |
|---|---|---|---|
| 6,792,161 B1 * | 9/2004 | Imaizumi | G01N 21/94 356/237.1 |
| 7,119,926 B2 * | 10/2006 | Takeda | H04N 1/00002 358/1.14 |
| 7,660,018 B2 * | 2/2010 | Shimizu | G06T 7/0002 358/3.26 |
| 7,710,617 B2 * | 5/2010 | Ishiguro | H04N 1/00002 358/514 |
| 7,742,180 B2 * | 6/2010 | Saida | H04N 1/00002 358/1.14 |
| 7,782,506 B2 * | 8/2010 | Suzuki | H04N 1/00002 358/463 |

(Continued)

FOREIGN PATENT DOCUMENTS

| | | |
|---|---|---|
| JP | 2000-081787 A | 3/2000 |
| JP | 2003-084570 A | 3/2003 |

(Continued)

*Primary Examiner* — Paul F Payer
(74) *Attorney, Agent, or Firm* — Sughrue Mion, PLLC

(57) ABSTRACT

An image reading device includes: a transport path; a reading member that reads an image of a document at a reading position on the transport path, and that includes a light source movable with respect to the reading position in a sub scanning direction which extends along a document transport direction and being capable of reading at positions in the vertical scanning direction; a reflecting member that has a reflecting surface that faces the reading member; a movement controller that controls the reading member so as to move the light source with respect to the reading position before the document is transported to the reading position when the reading member reads the image; a dust determination unit that determines presence of dust; and an announcement member that announces presence of dust to a user when dust is present.

7 Claims, 8 Drawing Sheets

(56) References Cited

U.S. PATENT DOCUMENTS

| | | | |
|---|---|---|---|
| 8,467,108 B2 | 6/2013 | Shimatani | |
| 8,687,244 B2 * | 4/2014 | Kato | G03G 15/5025 358/448 |
| 2003/0090742 A1 * | 5/2003 | Fukuda | H04N 1/04 358/448 |
| 2005/0179954 A1 * | 8/2005 | Arai | H04N 1/00002 358/3.26 |
| 2015/0022868 A1 * | 1/2015 | Shimizu | H04N 1/125 358/475 |

FOREIGN PATENT DOCUMENTS

| | | |
|---|---|---|
| JP | 2005-269269 A | 9/2005 |
| JP | 2007-028396 A | 2/2007 |
| JP | 2009-171185 A | 7/2009 |
| JP | 2013-229709 A | 11/2013 |

* cited by examiner

IMAGE READING DEVICE AND IMAGE FORMING DEVICE FOR DETECTING PRESENCE OF DUST ON A READING POSITION

CROSS-REFERENCE TO RELATED APPLICATIONS

This application is based on and claims priority under 35 USC 119 from Japanese Patent Application No. 2014-233910 filed Nov. 18, 2014.

BACKGROUND

Technical Field

The present invention relates to an image reading device and an image forming device.

SUMMARY

According to an aspect of the present invention, there is provided an image reading device including: a transport path through which a document is transported; a reading member that reads an image of the document at a reading position set in advance on the transport path, the reading member including a light source that is movable with respect to the reading position in a sub scanning direction which extends along a document transport direction and being capable of reading at plural positions in the sub scanning direction; a reflecting member that has a reflecting surface that faces the reading member over a range that includes the reading position and that extends to a position that is different from the reading position in the sub scanning direction, a difference between an amount of light reflected from the reflecting surface and an amount of light reflected from the document being set to be larger than a difference in amount of light set in advance; a movement controller that controls the reading member so as to move the light source with respect to the reading position before the document is transported to the reading position in a case where the reading member reads the image of the document; a dust determination unit that determines presence of dust on a basis of an image read when the light source is moved; and an announcement member that announces presence of dust to a user in a case where it is determined that dust is present.

BRIEF DESCRIPTION OF THE DRAWINGS

An exemplary embodiment of the present invention will be described in detail based on the following figures, wherein.

DETAILED DESCRIPTION

Figure 1:
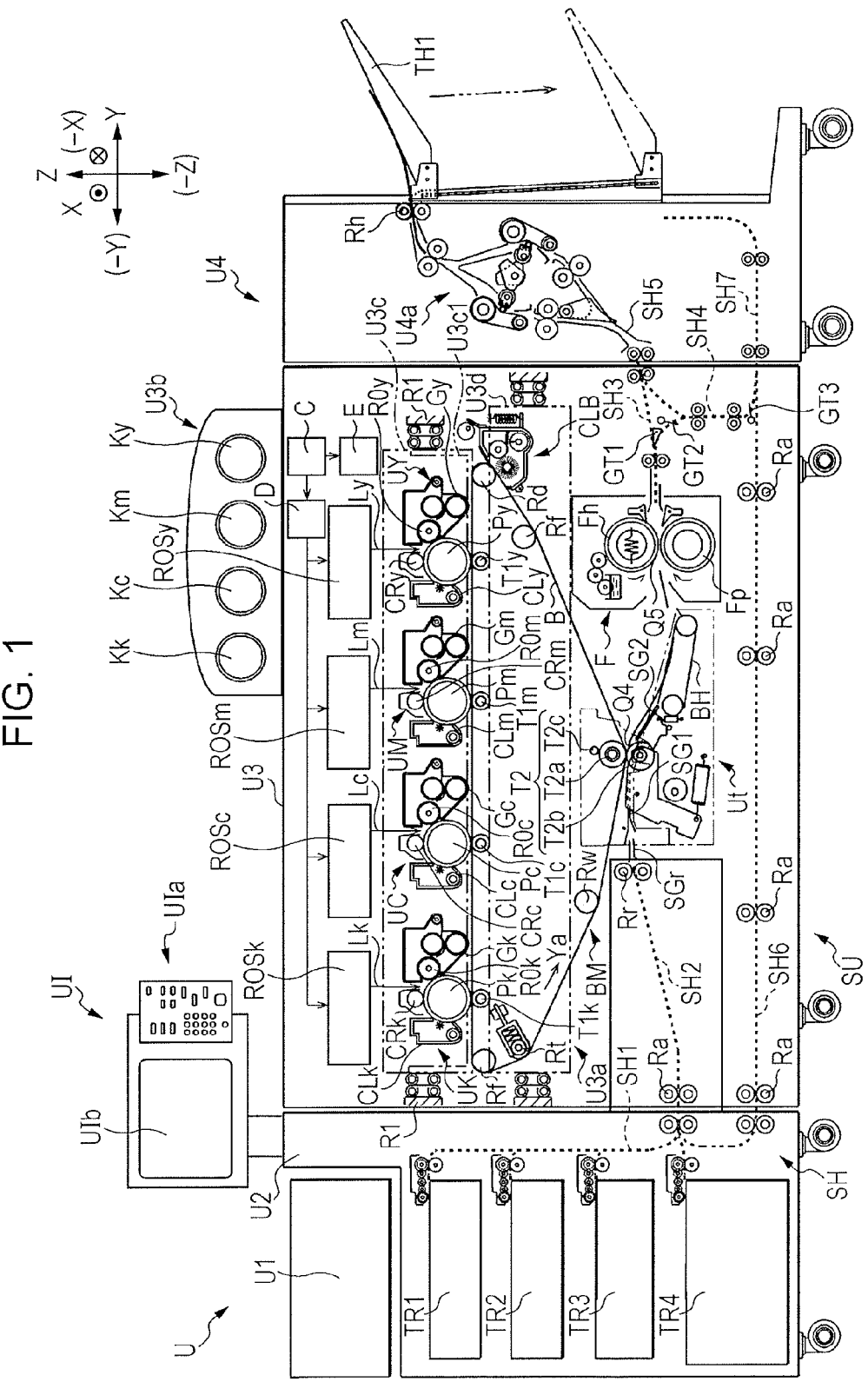
FIG. 1 is an overall view of an image forming device according to a first exemplary embodiment.

A specific exemplary embodiment (hereinafter referred to as an "exemplary embodiment") of the present invention will be described below with reference to the drawings. The present invention is not limited to the following exemplary embodiment.

In the drawings, in order to facilitate understanding of the following description, the front-rear direction is defined as the X-axis direction, the left-right direction is defined as the Y-axis direction, and the up-down direction is defined as Z-axis direction, and the directions and the sides indicated by the arrows X, −X, Y, −Y, Z, and −Z are referred to as forward, rearward, rightward, leftward, upward, and downward, and the front side, the rear side, the right side, the left side, the upper side, and the lower side.

In the drawings, in addition, a circular mark provided with a dot in the center means an arrow directed from the back side toward the front side of the drawing sheet surface, and a circular mark provided with a cross mark in the center means an arrow directed from the front side toward the back side of the drawing sheet surface.

In the following description of the drawings, members other than those required to facilitate understanding the description are not illustrated as appropriate.

[First Exemplary Embodiment]

FIG. 1 is an overall view of an image forming device according to a first exemplary embodiment.

Figure 2:
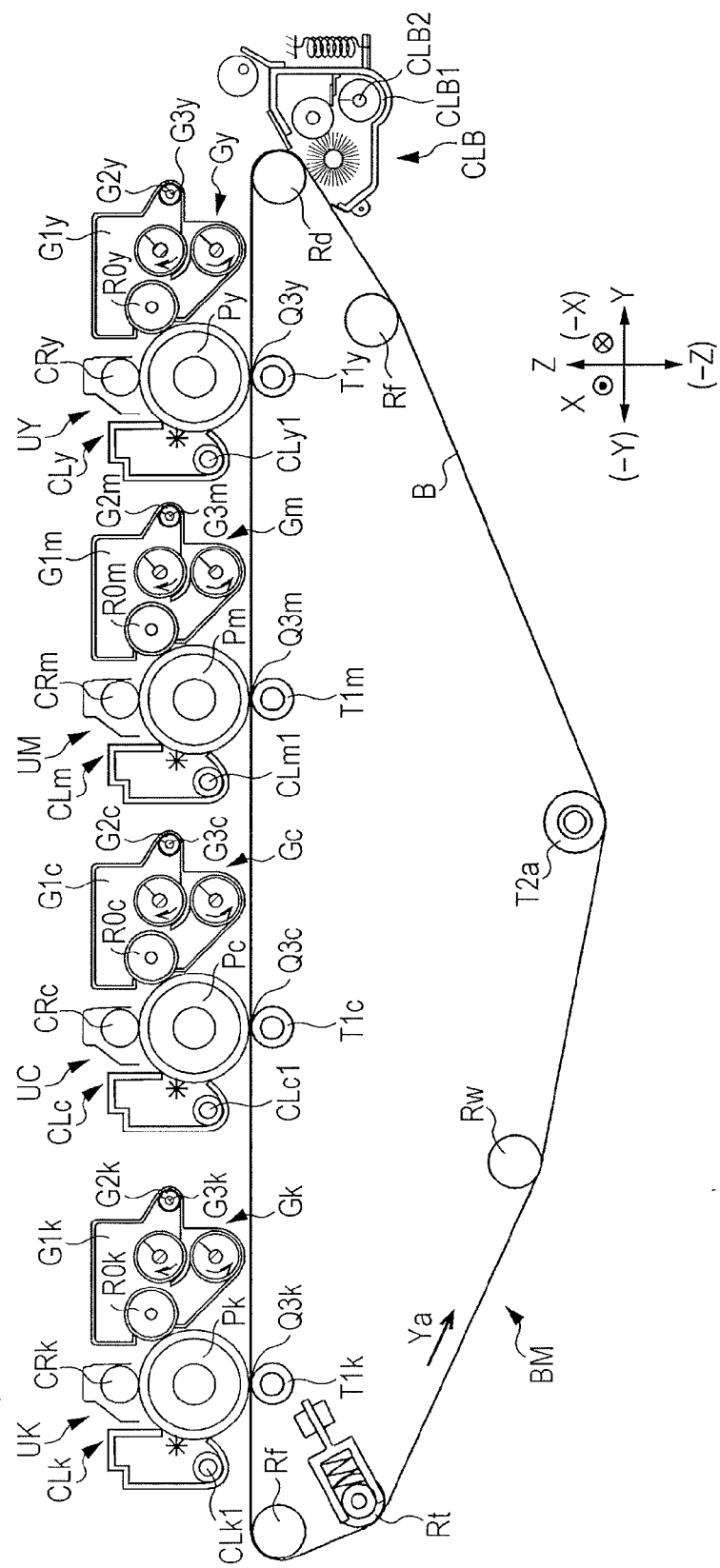
FIG. 2 is an enlarged view of a visible image forming device according to the first exemplary embodiment.

FIG. 2 is an enlarged view of a visible image forming device according to the first exemplary embodiment.

As illustrated in FIG. 1, a copier U that serves as an example of the image forming device includes an operation section UI, a scanner section U1 that serves as an example of an image reading device, a feeder section U2 that serves as an example of a medium supply device, an image preparation section U3 that serves as an example of an image recording device, and a medium processing device U4.

(Operation Section UI)

The operation section UI includes input buttons UIa used to start copying, set the number of copies to be made, and so forth. The operation section UI also includes a display section UIb that displays a content input using the input buttons UIa and the state of the copier U.

(Scanner Section U1)

Figure 3:
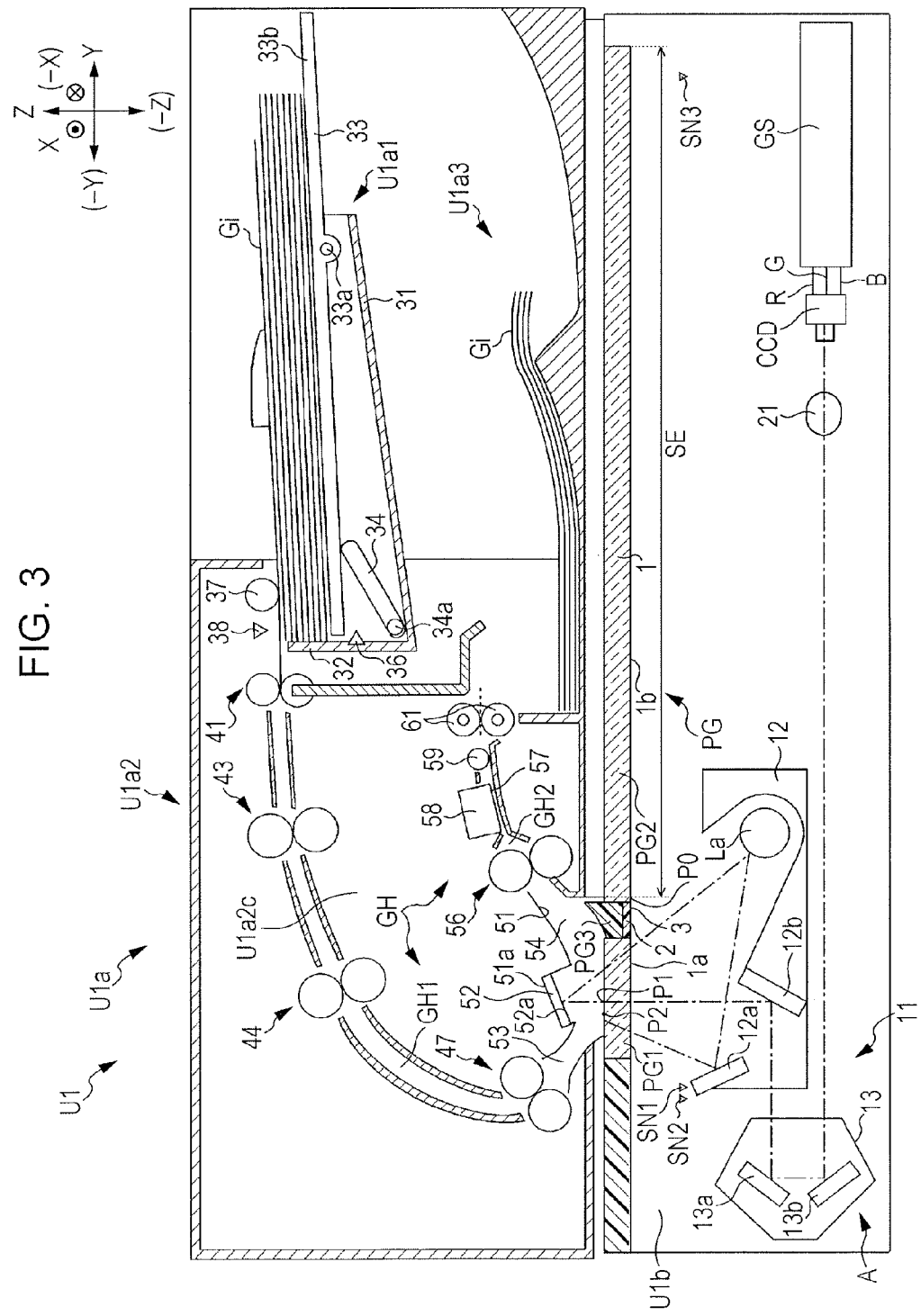
FIG. 3 is an overall view of an image reading device according to the first exemplary embodiment.

FIG. 3 is an overall view of the image reading device according to the first exemplary embodiment.

As illustrated in FIGS. 1 and 3, the scanner section U1 includes a scanner body U1b that serves as an example of the body portion of the image reading device. The scanner body U1b includes a document platen PG that is transparent and provided at the upper end of the scanner body U1b. A document transport device U1a is supported on the upper surface of the scanner body U1b so as to open and close the document platen PG.

The document transport device U1a includes a document feed tray U1a1 that serves as an example of a document loading portion. Plural documents Gi to be copied are housed in a stacked state in the document feed tray U1a1. A document transport portion U1a2 is provided to the left of the document feed tray U1a1. The document transport portion U1a2 transports the document G1 in the document feed tray U1a1 onto the document platen PG. A document paper exit tray U1a3 that serves as an example of a document ejection portion is disposed under the document feed tray U1a1. The document Gi having passed through the document platen PG is ejected from the document transport portion U1a2 to the document paper exit tray U1a3.

As illustrated in FIG. 3, a document passage surface PG1 that serves as an example of a first reading surface is disposed at the left end portion of the document platen PG in correspondence with a first image reading position P1 set in advance. The document Gi transported by the document transport device U1a passes through the document passage surface PG1. A document placement surface PG2 that supports the document G1 placed by a user is disposed to the right of the document passage surface PG1. A document guide PG3 that serves as an example of a guide section is supported between the document passage surface PG1 and the document placement surface PG2. The document guide PG3 guides the document G1 having passed through the document passage surface PG1 into the document transport device U1a.

A light-exposure optical system A is supported inside the scanner body U1b. The light-exposure optical system A includes a lamp La that serves as an example of a light source. The lamp La radiates light toward the document G1 passing on the document passage surface PG1 or the document Gi placed on the document placement surface PG2. Reflected light from the document Gi is converted into an electrical signal for red R, green G, and blue B by a solid-state imaging device CCD that serves as an example of a first reading member via plural optical members of the light-exposure optical system A, and the electrical signal is input to an image processing section GS.

The image processing section GS converts the electrical signal for R, G, and B input from the solid-state imaging device CCD into image information for black K, yellow Y, magenta M, and cyan C, temporarily stores the image information, and outputs the image information to a drive circuit D of a latent image forming device of the image preparation section U3 as image information for latent image formation at a timing set in advance.

In the case where a document image is a so-called monochrome image, image information for black K only is input to the drive circuit D of the latent image forming device.

The scanner body U1b according to the first exemplary embodiment is composed of the document platen PG, the light-exposure optical system A, the solid-state imaging device CCD, and the image processing section GS.

(Feeder Section U2)

As illustrated in FIG. 1, the feeder section U2 includes plural paper feed trays TR1, TR2, TR3, and TR4 that serve as examples of medium storage containers. The feeder section U2 also has a medium supply path SH1 etc. Recording paper S that serves as an example of an image recording medium and that has been taken out of the paper feed trays TR1 to TR4 is transported to the image preparation section U3 through the medium supply path SH1.

(Image Preparation Section U3 and Medium Processing Device U4)

As illustrated in FIG. 1, the image preparation section U3 includes an image recording section U3a that records an image on the recording paper S transported from the feeder section U2 on the basis of the document image read by the scanner section U1.

As illustrated in FIGS. 1 and 2, the drive circuit D of the latent image forming device of the image preparation section U3 outputs a drive signal to latent image forming devices ROSy, ROSm, ROSc, and ROSk for the colors Y to K on the basis of the image information input from the scanner section U1 at a timing set in advance. Photosensitive drums Py, Pm, Pc, and Pk that serve as examples of image holding elements are disposed under the latent image forming devices ROSy to ROSk, respectively. The rotating surfaces of the photosensitive drums Py, Pm, Pc, and Pk are uniformly charged by charging rollers CRy, CRm, CRc, and CRk, respectively, that serve as examples of chargers. An electrostatic latent image is formed on the charged surfaces of the photosensitive drums Py to Pk by laser beams Ly, Lm, Lc, and Lk, respectively, that serve as examples of latent image writing light output from the latent image forming devices ROSy, ROSm, ROSc, and ROSk. The electrostatic latent images on the surfaces of the photosensitive drums Py, Pm, Pc, and Pk are developed into toner images that serve as examples of visible images for yellow Y, magenta M, cyan C, and black K, respectively, by developing devices Gy, Gm, Gc, and Gk.

A developer consumed for development in the developing devices Gy to Gk is replenished by toner cartridges Ky, Km, Kc, and Kk that serve as examples of developer storage containers removably mounted to a developer replenishment device U3b. In the first exemplary embodiment, a two-part developer containing a toner and a carrier is used as the developer. A so-called highly concentrated developer containing a larger proportion of toner than the concentration of toner in the developing devices Gy to Gk is supplied from the toner cartridges Ky, Km, Kc, and Kk. Thus, in the developing devices Gy to Gk according to the first exemplary embodiment, the carrier is exchanged by discharging a developer containing a degraded carrier little by little from the developing devices Gy to Gk while supplying a highly concentrated developer containing a small amount of carrier. Such a technique for exchanging a carrier little by little is known in the art, and therefore is not described in detail.

In the developing devices Gy to Gk, the developer in the developing devices Gy to Gk is exchanged with a new developer little by little by discharging the developer containing a degraded carrier to the rear end portion of the developing devices Gy to Gk from degraded developer discharge portions G1y to G1k and supplying a developer containing a new carrier from the toner cartridges Ky to Kk. The developer discharged from the degraded developer discharge portions G1y to G1k flows into degraded developer transport paths G2y to G2k that extend rearward, and is transported rearward by degraded developer transport members G3y to G3k disposed in the degraded developer transport paths G2y to G2k to be collected by a degraded developer collection portion (not illustrated).

The toner images on the surfaces of the photosensitive drums Py, Pm, Pc, and Pk are transferred onto an intermediate transfer belt B that serves as an example of an intermediate transfer body by first transfer rollers T1y, T1m, T1c, and T1k, respectively, that serve as examples of first transferers sequentially in first transfer regions Q3y, Q3m, Q3c, and Q3k in an overlapping manner to form a color toner image that serves as an example of a multi-color visible image on the intermediate transfer belt B. The color toner image formed on the intermediate transfer belt B is transported to a second transfer region Q4.

In the case of image information for K color only, only the photosensitive drum Pk and the developing device Gk for K color are used to form only a toner image for K color.

Drum cleaners CLy, CLm, CLc, and CLk that serve as examples of image holding element cleaners are used to remove residues such as a residual developer and paper powder that adhere to the surfaces of the photosensitive drums Py, Pm, Pc, and Pk after the first transfer.

In the first exemplary embodiment, the photosensitive drum Pk, the charging roller CRk, and the drum cleaner CLk are integrated as a photosensitive unit UK for K color that serves as an example an image holding element unit. Also for the other colors Y, M, and C, photosensitive units UY, UM, and UC are composed of the photosensitive drums Py, Pm, and Pc, the charging rollers CRy, CRm, CRc, and the drum cleaners CLy, CLm, and CLc, respectively.

In addition, a visible image forming device UK+Gk for K color is composed of the photosensitive unit UK for K color and the developing device Gk having a developing roller R0k that serves as an example of a developer holding element. Likewise, visible image forming devices UY+Gy, UM+Gm, and UC+Gc for Y, M, and C colors are composed of the photosensitive units UY, UM, and UC for Y, M, and C colors and the developing devices Gy, Gm, and Gc having developing rollers R0y, R0m, and R0c, respectively.

A visible image forming device drawer U3c that serves as an example of a drawing member is disposed under the latent image forming devices ROSy, ROSm, ROSc, and ROSk for the colors Y to K. The visible image forming device drawer U3c is supported by slide rails R1, R1 that serve as an example of a pair or left and right guide members so as to be movable between a drawn position at which the visible image forming device drawer U3c is drawn forward of the image preparation section U3 and a mounted position at which the visible image forming device drawer U3c is mounted inside the image preparation section U3.

The visible image forming device drawer U3c includes a drawer body U3c1 that serves as an example of a holding portion. The photosensitive units UY, UM, UC, and UK and the developing devices Gy, Gm, Gc, and Gk are removably mounted to the drawer body U3c1.

An intermediate transfer device drawer U3d that serves as an example of a drawing member is disposed under the visible image forming device drawer U3c. The intermediate transfer device drawer U3d is supported so as to be movable between a drawn position at which the intermediate transfer device drawer U3d is drawn forward of the image preparation section U3 and a mounted position at which the intermediate transfer device drawer U3d is mounted inside the image preparation section U3. A belt module BM that serves as an example of an intermediate transfer device is supported by the intermediate transfer device drawer U3d so as to be ascended and descended between an ascended position at which the belt module BM contacts the lower surfaces of the photosensitive drums Py, Pm, Pc, and Pk and a descended position at which the belt module BM is separated downward from the lower surfaces of the photosensitive drums Py, Pm, Pc, and Pk.

The belt module BM includes the intermediate transfer belt B, a drive roller Rd that serves as an example of an intermediate transfer body drive member, a tension roller Rt that serves as an example of a tension application member, a walking roller Rw that serves as an example of a meandering prevention member, plural idler rollers Rf that serve as examples of driven members, a back-up roller T2a that serves as an example of an opposing member, and the first transfer rollers T1y, T1m, T1c, and T1k. Belt support rollers Rd+Rt+Rw+Rf+T2a that serve as an example of an intermediate transfer member support member are composed of the drive roller Rd, the tension roller Rt, the walking roller Rw, the idler rollers Rf, and the back-up roller T2a. The intermediate transfer belt B is supported by the belt support rollers Rd+Rt+Rw+Rf+T2a so as to be rotatable in the direction of the arrow Ya.

A second transfer unit Ut is disposed under the back-up roller T2a. The second transfer unit Ut includes a second transfer roller T2b that serves as an example of a second transfer member. The second transfer roller T2b is disposed so as to be brought into and out of press contact with the back-up roller T2a across the intermediate transfer belt B. The second transfer region Q4 is formed by a region in which the second transfer roller T2b contacts the intermediate transfer belt B. In addition, a contact roller T2c that serves as an example of a power feed member contacts the back-up roller T2a. A second transfer voltage having the same polarity as the toner charging polarity is applied from a power source circuit E controlled by a control section C to the contact roller T2c at a timing set in advance.

A second transferer T2 is composed of the back-up roller T2a, the second transfer roller T2b, and the contact roller T2c.

A medium transport path SH2 is disposed under the belt module BM. The recording paper S fed from the supply path SH1 of the feeder section U2 is transported to a resister roller Rr that serves as an example of a transport timing adjustment member by a transport roller Ra that serves as an example of a medium transport member. The resister roller Rr transports the recording paper S downstream at a timing that matches the transport of the toner image formed on the intermediate transfer belt B to the second transfer region Q4. The recording paper S fed by the resister roller Rr is guided by a register-side paper guide SGr and a pre-transfer paper guide SG1 to be transported to the second transfer region Q4.

The register-side paper guide SGr according to the first exemplary embodiment is fixed to the image preparation section U3 together with the resister roller Rr.

The toner image on the intermediate transfer belt B is transferred to the recording paper S by the second transferer T2 when the toner image passes through the second transfer region Q4. In the case of a color toner image, toner images transferred to the surface of the intermediate transfer belt B in an overlapping manner through a first transfer are collectively transferred to the recording paper S through a second transfer.

A transfer device T1y to T1k+T2+B according to the first exemplary embodiment is composed of the first transfer rollers T1y to T1k, the second transferer T2, and the intermediate transfer belt B.

The intermediate transfer belt B after the second transfer is cleaned by a belt cleaner CLB that serves as an example of an intermediate transfer body cleaner and that is disposed downstream of the second transfer region Q4. The belt cleaner CLB removes residues such as an untransferred remaining developer and paper powder from the intermediate transfer belt B in the second transfer region Q4. As illustrated in FIG. 2, the residues removed from the intermediate transfer belt B flow into a belt cleaner residue transport path CLB1 provided in the lower portion in the belt cleaner CLB to extend rearward, and is transported to the rear side of the image preparation section U3 by a belt cleaner residue transport member CLB2 disposed in the belt cleaner residue transport path CLB1 to be collected by the degraded developer collection portion (not illustrated).

The recording paper S to which the toner image has been transferred is guided by a post-transfer paper guide SG2 to be fed to a medium transport belt BH that serves as an example of a transport member. The medium transport belt BH transports the recording paper S to a fixing device F.

The fixing device F includes a heating roller Fh that serves as an example of a heating member and a pressurizing roller Fp that serves as an example of a pressurizing member. The recording paper S is transported to a fixing region Q5 which is a region in which the heating roller Fh and the pressurizing roller Fp contact each other. The toner image on the recording paper S is heated and pressurized by the fixing device F to be fixed when the recording paper S passes through the fixing region Q5.

The image recording section U3a according to the first exemplary embodiment is composed of the visible image forming devices UY+Gy to UK+Gk, the transfer devices T1y to T1k+T2+B, and the fixing device F.

A switching gate GT1 that serves as an example of a switching member is provided downstream of the fixing device F. The switching gate GT1 selectively switches the recording paper S having passed through the fixing region Q5 to an ejection path SH3 on the medium processing device U4 side or a reversal path SH4. The paper S transported to the ejection path SH3 is transported to a sheet transport path SH5 of the medium processing device U4. A curl correction member U4a that serves as an example of a warp correction member is disposed in the sheet transport path SH5. The curl correction member U4a corrects a warp, or a so-called curl, of the recording paper S being transported. The recording paper S, a curl of which has been corrected, is ejected with an image fixation surface of the paper facing upward to an ejection tray TH1 that serves as an example of a medium ejection portion by an ejection roller Rh that serves as an example of a medium ejection member.

The recording paper S transported to the side of the paper reversal path SH4 of the image preparation section U3 by the switching gate GT1 is transported to the reversal path SH4 of the image preparation section U3 through a second gate GT2 that serves as an example of a switching member.

At this time, in the case where the recording paper S is to be ejected with the image fixation surface facing downward, the transport direction of the recording paper S is reversed after the rear end of the recording paper S in the transport direction passes through the second gate GT2. The second gate GT2 according to the first exemplary embodiment is constituted of a thin-film elastic member. Thus, the second gate GT2 allows the recording paper S transported to the reversal path SH4 to temporarily pass therethrough, and guides the recording paper S toward the transport paths SH3 and SH5 when the recording paper S having passed therethrough is reversed or switched back. Then, the recording paper S which has been switched back passes through the curl correction member U4a, and is ejected to the ejection tray TH1 with the image fixation surface facing downward.

A circulation path SH6 is connected to the reversal path SH4 of the image preparation section U3. A third gate GT3 that serves as an example of a switching member is disposed at the portion of connection. In addition, the downstream end of the reversal path SH4 is connected to a reversal path SH7 of the medium processing device U4.

The recording paper S transported to the reversal path SH4 through the switching gate GT1 is transported toward the reversal path SH7 of the medium processing device U4 by the third gate GT3. As with the second gate GT2, the third gate GT3 according to the first exemplary embodiment is constituted of a thin-film elastic member. Thus, the third gate GT3 allows the recording paper S transported through the reversal path SH4 to temporarily pass therethrough, and guides the recording paper S toward the circulation path SH6 when the recording paper S having passed therethrough is switched back.

The recording paper S transported to the circulation path SH6 is refed to the fixing region Q4 through the paper feed path SH1 for printing on the second surface.

A sheet transport path SH is composed of elements indicated by the symbols SH1 to SH7. In addition, a paper transport device SU according to the first exemplary embodiment is composed of elements indicated by the symbols SH, Ra, Rr, Rh, SGr, SG1, SG2, BH, and GT1 to GT3.

(Body Portion U1b of Image Reading Device)

Figure 4:
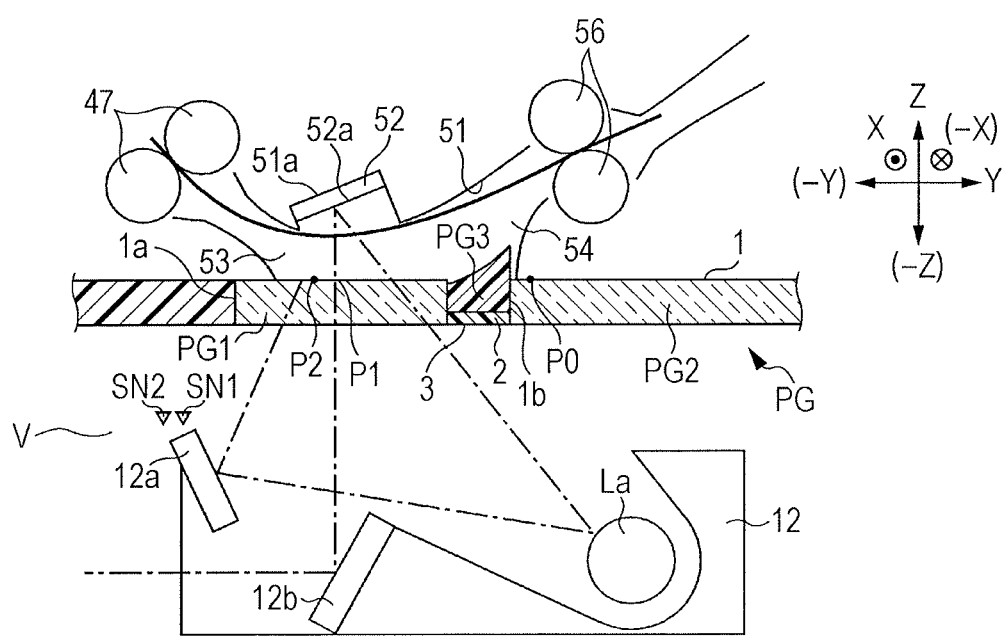
FIG. 4 illustrates a portion of a body portion of the image reading device according to the first exemplary embodiment.

FIG. 4 illustrates a portion of a body portion of the image reading device according to the first exemplary embodiment.

As illustrated in FIGS. 3 and 4, a glass support port 1 that serves as an example of an opening is formed in the upper surface of the scanner body U1b. The glass support port 1 according to the first exemplary embodiment is formed in a rectangular shape. A guide support portion 2 that serves as an example of a partitioning portion is provided on the left portion of the glass support port 1. The guide support portion 2 is formed in the shape of a plate that extends in the front-rear direction.

Hence, the glass support port 1 is partitioned into a rectangular automatic reading port 1a on the left end side that extends in the front-rear direction and a rectangular manual reading port 1b on the right side that is larger than the maximum readable document size set in advance. The document passage surface PG1 is supported on the automatic reading port 1a. The document placement surface PG2 is supported on the manual reading port 1b. The document passage surface PG1 and the document placement surface PG2 according to the first exemplary embodiment are formed from transparent glass.

In addition, the document guide PG3 is supported on the upper surface of the guide support portion 2. The document guide PG3 according to the first exemplary embodiment is formed to extend in the front-rear direction, and is shaped to be inclined upward toward the right with the height of its left end set to be lower than the height of the upper surface of the document passage surface PG1. A white reference plate 3 that serves as an example of a reference member is supported on the lower surface of the guide support portion 2. The white reference plate 3 according to the first exemplary embodiment is read as a reference for white adjustment during reading by the solid-state imaging device CCD.

As illustrated in FIGS. 3 and 4, a reading member 11 is disposed in a space V under the document platen PG. The reading member 11 is supported by the scanner body U1b so as to be movable in the left-right direction along the lower surface of the document platen PG.

In the configuration according to the first exemplary embodiment, the first image reading position P1 is set to the center portion of the document passage surface PG1 in the left-right direction. In addition, an upstream position P2 is set to the left end of the document passage surface PG1.

In addition, a manual reading region SE is set in advance on the document placement surface PG2 in accordance with the largest document Gi that is placeable on the document placement surface PG2. A home position P0 is set to the left end of the manual reading region SE.

The reading member 11 according to the first exemplary embodiment is supported so as to be movable between the position of the right end of the manual reading region SE and the upstream position P2.

In the configuration according to the first exemplary embodiment, in addition, the reading member 11 stands by at the home position P0 before a job starts. During "automatic reading operation" for reading an image of the document Gi transported using the document transport device U1a, the reading member 11 moves to the document passage surface PG1. During "manual reading operation" for reading an image of the document Gi manually placed on the document placement surface PG2, meanwhile, the reading member 11 moves from the home position P0 to the right end of the manual reading region SE. The reading member 11 includes an irradiation system unit 12 and a reflection unit 13 disposed to the left of the irradiation system unit 12. As illustrated in FIGS. 3 and 4, the irradiation system unit 12 is provided with the lamp La. An illumination light reflecting plate 12a is supported to the left of the lamp La. The irradiation system unit 12 also includes a reflected light reflecting plate 12b positioned between the lamp La and the illumination light reflecting plate 12a.

As illustrated in FIG. 3, the reflection unit 13 includes a first reflecting plate 13a and a second reflecting plate 13b disposed under the first reflecting plate 13a. An imaging member 21 is disposed to the right of the second reflecting plate 13b. An irradiation system resister sensor Sp that serves as an example of a unit position detection member is disposed in the upper left portion of the space V. The irradiation system resister sensor Sp according to the first exemplary embodiment detects the position of the reading member 11 which has been moved to the home position P0.

In addition, a first position sensor SN1 that serves as an example of a first position detection member and a second position sensor SN2 that serves as an example of a second position detection member are disposed in the upper left portion of the space V so as to correspond to a case where the reading member 11 is moved to the first image reading position P1 or the upstream position P2. A third position detection sensor SN3 is disposed in the upper right portion of the space V so as to correspond to a case where the reading member 11 is moved to the right end of the manual reading region SE.

In the first exemplary embodiment, the light-exposure optical system A is composed of the imaging member 21, the reflected light reflecting plate 12b, the first reflecting plate 13a, and the second reflecting plate 13b. The solid-state imaging device CCD is disposed to the right of the imaging member 21. The image processing section GS is disposed to the right of the solid-state imaging device CCD.

(Document Transport Device U1a)

As illustrated in FIG. 3, the document feed tray U1a1 of the document transport device U1a includes a bottom portion 31 and a left wall 32 that extends upward from the left end of the bottom portion 31. An ascent/descent plate 33 that serves as an example of an ascent/descent member is supported on the bottom portion 31 so as to be rotatable about a center of rotation 33a. A document loading surface 33b is formed on the upper surface of the ascent/descent plate 33.

An ascent/descent rod 34 that serves as an example of an ascent/descent drive member contacts the lower surface of the left end portion of the ascent/descent plate 33. Drive from a drive source (not illustrated) may be transmitted to a center of rotation 34a of the ascent/descent rod 34. Thus, rotation of the ascent/descent rod 34 ascends and descends the left end of the ascent/descent plate 33.

A document amount sensor 36 that serves as an example of a document amount detection member is disposed in front of the ascent/descent plate 33. The document amount sensor 36 detects the presence or absence of the ascent/descent plate 33 or the document Gi to detect the amount of the document Gi. That is, in the case where the ascent/descent plate 33 is ascended, if the amount of the document Gi is small, the ascent/descent plate 33 is moved to a location above the height of the document amount sensor 36 so that the ascent/descent plate 33 is not detected. If the amount of the document Gi is large, on the other hand, the ascent/descent plate 33 is positioned at a location below the height of the document amount sensor 36 so that the ascent/descent plate 33 or the document Gi is detected by the document amount sensor 36.

Hence, it is detectable whether the amount of the document is more or less than an amount set in advance on the basis of the result of detection by the document amount sensor 36 at the time when the ascent/descent plate 33 is ascended.

A nudger roller 37 that serves as an example of a document takeout member is disposed above the left end portion of the ascent/descent plate 33. A document detection sensor 38 that serves as an example of a document detection member is disposed to the left of the nudger roller 37. A document handling roller 41 that serves as an example of a document handling member is disposed to the left of the document detection sensor 38.

In addition, a document transport path GH through which the document Gi is transported is formed inside the document transport portion U1a2 of the document transport device U1a. The document transport path GH includes a first document transport path GH1 curved arcuately from the document handling roller 41 toward the first image reading position P1 and a second document transport path GH2 that extends from the first image reading position P1 to the document paper exit tray U1a3. A document transport roller 43 that serves as an example of a document transport member is disposed in the first document transport path GH1 at a position downstream of the document handling roller 41 in the document transport direction.

A pre-register roller 44 that serves as an example of a first correction unit which serves as an example of a correction unit is disposed downstream of the document transport roller 43. A document register roller 47 that serves as an example of a document transport timing adjustment member is disposed downstream of the pre-register roller 44.

As illustrated in FIGS. 3 and 4, a reading guide 51 that serves as an example of a reading guide member is provided in the first document transport path GH1 at a position facing the document passage surface PG1. The reading guide 51 is formed in the shape of a semi-circle that projects downward. A plate support portion 51a is formed on the reading guide 51 at a position facing the center portion of the document passage surface PG1 in the left-right direction.

The plate support portion 51a according to the first exemplary embodiment is formed to be recessed upward with respect to the reading guide 51. The upper surface of the plate support portion 51a is formed to be inclined upward toward the right.

A guide reflecting plate 52 that serves as an example of a reflecting member is supported on the plate support portion 51a. The guide reflecting plate 52 according to the first exemplary embodiment is formed in the shape of a plate that extends in the front-rear direction. Hence, the guide reflecting plate 52 according to the first exemplary embodiment is supported so as to be inclined upward toward the right along the plate support portion 51a. A reading region E1 is provided under the guide reflecting plate 52 in correspondence with the document passage surface PG1. The reading region E1 according to the first exemplary embodiment extends along the sub scanning direction with respect to the document passage surface PG1. In the reading region E1, the upstream position P2 and the first reading position P1 correspond to the position of the upstream portion and the position of the center portion, respectively, in the document transport direction.

The guide reflecting plate 52 according to the first exemplary embodiment is supported at a position corresponding to the reflected light reflecting plate 12b which is supported on the reading member 11 which moves in the reading region E1. A guide reflecting surface 52a that serves as an example of a reflecting surface is provided on the lower surface of the guide reflecting plate 52. The guide reflecting surface 52a according to the first exemplary embodiment is formed as a mirror surface. The guide reflecting surface 52a is provided to be inclined by an angle set in advance such that radiated light from the lamp La is regularly reflected toward the document passage surface PG1.

In addition, a transport outlet 53 is provided in the first document transport path GH1 at a position facing the upstream portion of the reading guide 51 in the document transport direction.

A transport inlet 54 is provided in the second document transport path GH2 at a position facing the downstream portion of the reading guide 51 in the document transport direction. A document transport roller 56 that serves as an example of a document transport member is disposed in the second document transport path GH2 downstream of the reading guide 51 in the document transport direction.

As illustrated in FIG. 3, an image reading sensor 58 that serves as an example of a second reading member is disposed downstream of the document transport roller 56 at a position corresponding to a second image reading position 57 set in advance.

The image reading sensor 58 according to the first exemplary embodiment is constituted of a contact image sensor (CIS).

A reading roller 59 that serves as an example of a reading assist member is disposed downstream of the image reading sensor 58. A document paper exit roller 61 that ejects the document Gi to the document paper exit tray U1a3 is disposed downstream of the reading roller 59.

(Function of Document Transport Device U1a)

In the document transport device U1a configured as described above, in the case where the document Gi is to be read, the ascent/descent plate 3 is ascended until the upper surface of the document Gi contacts the nudger roller 37 as illustrated in FIG. 3. Then, the nudger roller 37 is rotated to feed the document Gi. The document Gi fed by the nudger roller 37 is handled by the document handling roller 41 to be separated from the other documents. The separated document Gi is transported to the pre-register roller 44 by the document transport roller 43. The document Gi fed by the document transport roller 43 is transported downstream by the pre-register roller 44.

The document Gi transported by the pre-register roller 44 is transported to the first image reading position P1 at a matching timing by the document register roller 47. When the document Gi passes through the first image reading position P1, an image is read by the solid-state imaging device CCD via the light-exposure optical system A.

The document Gi having passed through the first image reading position P1 is transported by the document transport roller 56, and fed to the second image reading position 57. In the case where both surfaces of the document Gi are to be read, the image reading sensor 58 reads an image on a second surface, which is opposite to a first surface read by the solid-state imaging device CCD, when the document Gi passes through the second image reading position 57.

In the first exemplary embodiment, when an image is read by the image reading sensor 58, the reading roller 59 presses the document Gi to stabilize the gap between the document Gi and the image reading sensor 58. The document Gi having passed through the second image reading position 57 is ejected to the document paper exit tray U1a3 by the document paper exit roller 61.

(Control Section According to First Exemplary Embodiment)

Figure 5:
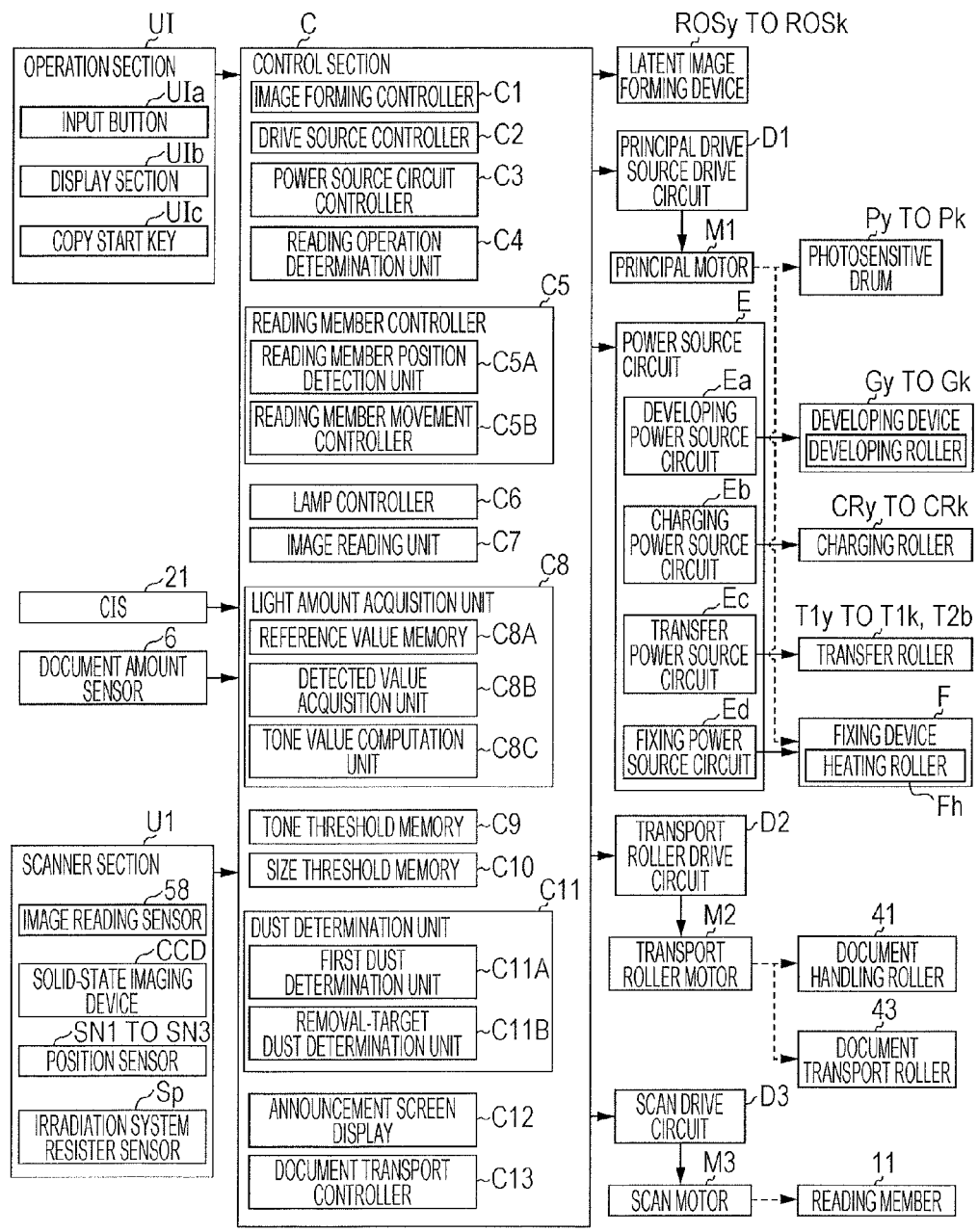
FIG. 5 is a block diagram illustrating the functions of a control section of the image forming device according to the first exemplary embodiment.

FIG. 5 is a block diagram illustrating the functions of the control section of the image forming device according to the first exemplary embodiment.

As illustrated in FIG. 5, the control section C of the copier U includes an input/output interface I/O that receives and outputs a signal from and to the outside. The control section C also includes a read-only memory (ROM) that stores a program, information, and so forth for performing a necessary process. The control section C further includes a random-access memory (RAM) that temporarily stores necessary data. The control section C additionally includes a central processing unit (CPU) that performs a process that matches the program stored in the ROM or the like. Thus, the control section C according to the first exemplary embodiment is constituted of a small information processing device, or a so-called microcomputer. Hence, the control section C may execute the program stored in the ROM or the like to implement a variety of functions.

(Signal Output Elements Connected to Control Section C of Image Preparation Section U3)

The control section C of the image preparation section U3 receives output signals from signal output elements such as the operation section UI, the solid-state imaging device CCD, the image reading sensor 58, the position sensors SN1 to SN3, and the irradiation system resister sensor Sp.

The operation section UI includes the input buttons UIa used to input the number of sheets to be printed, an arrow, and so forth, the display section UIb which serves as an example of an announcement member, a copy start key UIc that serves as an example of an input member used to make an input for starting copying operation and operation for reading the document Gi, and so forth.

The solid-state imaging device CCD reads an image on the first surface of the document Gi passing through the first image reading position P1.

The image reading sensor 58 reads an image on the second surface of the document Gi passing through the second image reading position 57.

The position sensors SN1 to SN3 and the irradiation system resister sensor Sp detect the reading member 11 which is moved to the first image reading position P1, the upstream position P2, the right end of the manual reading position SE, and the home position P0, respectively.

(Elements to Be Controlled Connected to Control Section C of Image Preparation Section U3)

The control section C of the image preparation section U3 is connected to a principal drive source drive circuit D1, a transport roller drive circuit D2, a scan drive circuit D3, the power source circuit E, and the other control elements (not illustrated). The control section C outputs a control signal to the circuits D1 to D3, E, and so forth.

D1: Principal Drive Source Drive Circuit

The principal drive source drive circuit D1 rotationally drives the photosensitive drums Py to Pk, the intermediate transfer belt B, and so forth via a principal motor M1 that serves as an example of a principal drive source.

D2: Transport Roller Drive Circuit

The transport roller drive circuit D2 which serves as an example of a transport member drive circuit drives a transport roller motor M2 that serves as an example of a document transport drive source to rotationally drive the document handling roller 41 and the document transport roller 43 disposed in the document transport path GH.

D3: Scan Drive Circuit

The scan drive circuit D3 which serves as an example of a scanning drive circuit drives a scan motor M3 that serves as an example of a scanning drive source to move the reading member 11 in the left-right direction along the lower surface of the document platen PG via a gear (not illustrated) or the like.

E: Power Source Circuit

The power source circuit E includes a developing power source circuit Ea, a charging power source circuit Eb, a transfer power source circuit Ec, a fixing power source circuit Ed, and so forth.

Ea: Developing Power Source Circuit

The developing power source circuit Ea applies a developing voltage to the developing rollers of the developing devices Gy to Gk.

Eb: Charging Power Source Circuit

The charging power source circuit Eb applies a charging voltage for charging the surfaces of the photosensitive drums Py to Pk to the charging rollers CRy to CRk, respectively.

Ec: Transfer Power Source Circuit

The transfer power source circuit Ec applies a transfer voltage to the second transfer roller T2b via the first transfer rollers T1y to T1k and the contact roller T2c.

Ed: Fixing Power Source Circuit

The fixing power source circuit Ed supplies power for heating a heater to the heating roller Fh of the fixing device F.

(Function of Control Section C of Image Preparation Section U3)

The control section C of the image preparation section U3 has a function of executing a process that matches input signals from the signal output elements to output control signals to the control elements. That is, the control section C has the following functions.

C1: Image Forming Controller

An image forming controller C1 controls drive of each member of the copier U, the voltage application timing, and so forth in accordance with the image information input from the solid-state imaging device CCD of the scanner section U1 and the image reading sensor 58 to execute a job corresponding to image forming operation.

C2: Drive Source Controller

A drive source controller C2 controls drive of the principal motor M1 via the principal drive source drive circuit D1 to control drive of the photosensitive drums Py to Pk etc.

C3: Power Source Circuit Controller

A power source circuit controller C3 controls the power source circuits Ea to Ed to control a voltage to be applied to each member and power to be supplied to each member.

C4: Reading Operation Determination Unit

A reading operation determination unit C4 determines whether reading operation to be executed is "automatic reading operation" or "manual reading operation". The reading operation determination unit C4 according to the first exemplary embodiment determines that "automatic reading operation" is to be executed in the case where the document Gi is detected on the document feed tray U1a1 on the basis of a detection signal acquired from the document detection sensor 38 when the copy start key UIc is pressed. Meanwhile, the reading operation determination unit C4 determines that "manual reading operation" is to be executed in the case where the document Gi is not detected on the document feed tray U1a1 by the document detection sensor 38.

C5: Reading Member Controller

A reading member controller C5 that serves as an example of a movement controller includes a reading member position detection unit C5A and a reading member movement controller C5B. The reading member controller C5 according to the first exemplary embodiment controls the reading member 11 in accordance with "automatic reading operation" or "manual reading operation" to be executed.

C5A: Reading Member Position Detection Unit

The reading member position detection unit C5A detects the position of the reading member 11. The reading member position detection unit C5A according to the first exemplary embodiment detects that the reading member 11 has been moved to any of the first image reading position P1, the upstream position P2, the right end of the manual reading region SE, and the home position P0 on the basis of detection signals acquired from the sensors SN1, SN2, SN3, and Sp.

C5B: Reading Member Movement Controller

The reading member movement controller C5B controls the scan motor M3 so as to move the reading member 11 in the left-right direction along the lower surface of the document platen PG. The reading member movement controller C5B according to the first exemplary embodiment moves the reading member 11 to the home position P0 when the copier U is turned on or recovers from power-saving operation.

In the case where the reading operation determination unit C4 determines that "automatic reading operation" is to be executed, the reading member movement controller C5B according to the first exemplary embodiment moves the reading member 11 at the home position P0 toward the upstream position P2. Then, in the case where the second position sensor SN2 detects the reading member 11, the reading member position detection unit C5A moves the reading member 11 toward the first image reading position P1. In the case where the first position sensor SN1 detects the reading member 11, movement of the reading member 11 is stopped. In the case where the job is ended, the reading member 11 is moved toward the home position P0. In the case where the irradiation system resister sensor Sp detects the reading member 11, movement of the reading member 11 is stopped.

In the case where the reading operation determination unit C4 determines that "manual reading operation" is to be executed, the reading member movement controller C5B according to the first exemplary embodiment moves the reading member 11 from the home position P0 toward the right end of the manual reading region SE. Then, in the case where the third position sensor SN3 detects the right end of the manual reading region SE, the reading member position determination unit C5A moves the reading member 11 toward the home position P0. Then, in the case where the first position sensor SN1 detects the reading member 11, movement of the reading member 11 is stopped.

C6: Lamp Controller

A lamp controller C6 that serves as an example of a light source controller controls turning on and off of the lamp La to control radiation of radiated light. In the case where it is determined by the reading operation determination unit C4 that "automatic reading operation" is to be executed, the lamp controller C6 according to the first exemplary embodiment turns on the lamp La when the reading member 11 moves to the upstream position P2, and turns off the lamp La when the job is ended. In the case where it is determined that "manual reading operation" is to be executed, the lamp controller C6 turns on the lamp La, and turns off the lamp La when the job is ended.

C7: Image Reading Unit

An image reading unit C7 reads an image of the document Gi on the basis of an output from the solid-state imaging device CCD and the image reading sensor 58. In the case of "automatic reading operation" and "two-sided reading" in which both the first surface and the second surface of the document Gi are to be read, the image reading unit C7 according to the first exemplary embodiment reads the first surface and the second surface of the document Gi using the solid-state imaging device CCD and the image reading sensor 58. In the case of "automatic reading operation" and "single-sided reading" in which the first surface of the document Gi is to be read, and in the case of "manual reading operation", the solid-state imaging device CCD is used to read an image of the document Gi.

C8: Light Amount Acquisition Unit

A light amount acquisition unit C8 includes a reference value memory C8A, a detected value acquisition unit C8B, and a tone value computation unit C8C, and acquires the amount of light between the first image reading position P1 and the upstream position P2. The light amount acquisition unit C8 according to the first exemplary embodiment acquires the amount of light using the solid-state imaging device CCD at a location between the first image reading position P1 and the upstream position P2 before the document Gi is transported through the document transport path GH in the case where the reading operation determination unit C4 determines that "automatic reading operation" is to be executed.

C8A: Reference Value Memory

The reference value memory C8A stores, as a reference value, a detected value detected by the solid-state imaging device CCD with no document Gi, dust, or the like present between the first image reading position P1 and the upstream position P2. The reference value memory C8A according to the first exemplary embodiment stores, as a reference value $V_0$, an upper limit value set in advance on the basis of the amount of light that may be received by the solid-state imaging device CCD between the first image reading position P1 and the upstream position P2.

The reference value memory C8A according to the first exemplary embodiment stores the reference value $V_0$ in pixels divided into meshes at intervals set in advance in the main scanning direction and the sub scanning direction in a region between the first image reading position P1 and the upstream position P2.

C8B: Detected Value Acquisition Unit

The detected value acquisition unit C8B acquires a detected value detected by the solid-state imaging device CCD at a location between the first image reading position P1 and the upstream position P2. The detected value acquisition unit C8B according to the first exemplary embodiment acquires a detected value $V_1$ detected by the solid-state imaging device CCD at a location between the first image reading position P1 and the upstream position P2 before the document Gi is transported in the case where it is determined by the reading operation determination unit C4 that "automatic reading operation" is to be executed. The detected value acquisition unit C8B according to the first exemplary embodiment detects the detected value $V_1$ for each pixel for which the reference value $V_0$ has been stored by the reference value memory C8A.

C8C: Tone Value Computation Unit

The tone value computation unit C8C which serves as an example of a dust determination value computation unit computes a tone value that indicates the value of light concentration at a location between the first image reading position P1 and the upstream position P2. The tone value computation unit C8C according to the first exemplary embodiment defines the reference value $V_0$ stored by the reference value memory C8A as "255", and computes a tone value $K_1$ that serves as an example of a dust determination value on the basis of each detected value $V_1$ acquired by the detected value acquisition unit C8B. The tone value $K_1$ according to the first exemplary embodiment is obtained by determining the integer portion of $V_1/V_0 \times 255$ as $K_1$, and computed for each pixel as a value in 256 steps. That is, the tone value computation unit C8C according to the first exemplary embodiment computes the distribution of concentration in a region between the first image reading position P1 and the upstream position P2. In the case where the detected value V' is larger than the reference value $V_0$, the tone value $K_1$ is set to "255" which is the upper limit value.

C9: Tone Threshold Memory

A tone threshold memory C9 that serves as an example of a first threshold memory stores a tone threshold that serves as an example of a threshold for determining the presence or absence of dust. The tone threshold memory C9 according to the first exemplary embodiment stores a detected value of light detected by the solid-state imaging device CCD as a tone threshold $K_a$ that serves as an example of a first threshold.

In the case where the detected value of light from the guide reflecting plate 52 is normalized to 255, the detected value of reflected light is equal to or less than "210" even for plain white paper. Hence, by way of example, the tone threshold memory C9 according to the first exemplary embodiment stores a detected value "220" obtained by adding a margin to the tone value $K_1$ "210" for plain white paper as the tone threshold $K_a$.

C10: Size Threshold Memory

A size threshold memory C10 that serves as an example of a second threshold memory stores a size threshold that serves as an example of a second threshold for determining, in the case where it is determined that there is dust, whether the dust is removal-target dust to be removed on the basis of the size of the dust. The size threshold memory C10 according to the first exemplary embodiment stores a size threshold for determining whether the dust is non-removal-target dust that is relatively small such as fine dust and toner or removal-target dust that is relatively large such as large dust, a toner stain, a paper fragment, a clip, and a staple. In addition, the size threshold memory C10 according to the first exemplary embodiment stores, as a size threshold N, the number of pixels that are continuous in the main scanning direction or the sub scanning direction set in advance and that have a detected value that is equal to or less than the tone threshold $K_a$.

C11: Foreign Matter Determination Unit

A dust determination unit C11 includes a first dust determination unit C11A and a removal-target dust determination unit C11B, and determines on the basis of the result of reading by the solid-state imaging device CCD whether or not there is dust between the first image reading position P1 and the upstream position P2. The dust determination unit C11 according to the first exemplary embodiment determines whether or not there is dust on the basis of the detected value of reflected light from the guide reflecting plate 52 detected between the first image reading position P1 and the upstream position P2 before the document Gi is transported in the case where it is determined by the reading operation determination unit C4 that "automatic reading operation" is to be executed after the copy start key UIc is pressed.

C11A: First Foreign Matter Determination Unit

The first dust determination unit C11A determines on the basis of the result of reading by the solid-state imaging device CCD whether or not there is dust between the first image reading position P1 and the upstream position P2. The first dust determination unit C11A according to the first exemplary embodiment determines on the basis of the tone value $K_1$ computed by the tone value computation unit C8C and the tone threshold $K_a$ stored by the tone threshold memory C9 that dust is present in the case where the tone value $K_1$ is equal to or less than the tone threshold $K_a$. The first dust determination unit C11A according to the first exemplary embodiment determines dust for each pixel between the first image reading position P1 and the upstream position P2.

C11B: Removal-target Foreign Matter Determination Unit

The removal-target dust determination unit C11B which serves as an example of a second dust determination unit determines on the basis of the result of reading by the solid-state imaging device CCD whether or not there is removal-target dust between the first image reading position P1 and the upstream position P2. The removal-target dust determination unit C11B according to the first exemplary embodiment determines that removal-target dust is present in the case where the number of pixels for which the first dust determination unit C11A has determined that dust is present and which are continuous in the main scanning direction or the sub scanning direction is equal to or more than the size threshold N.

Figure 6:
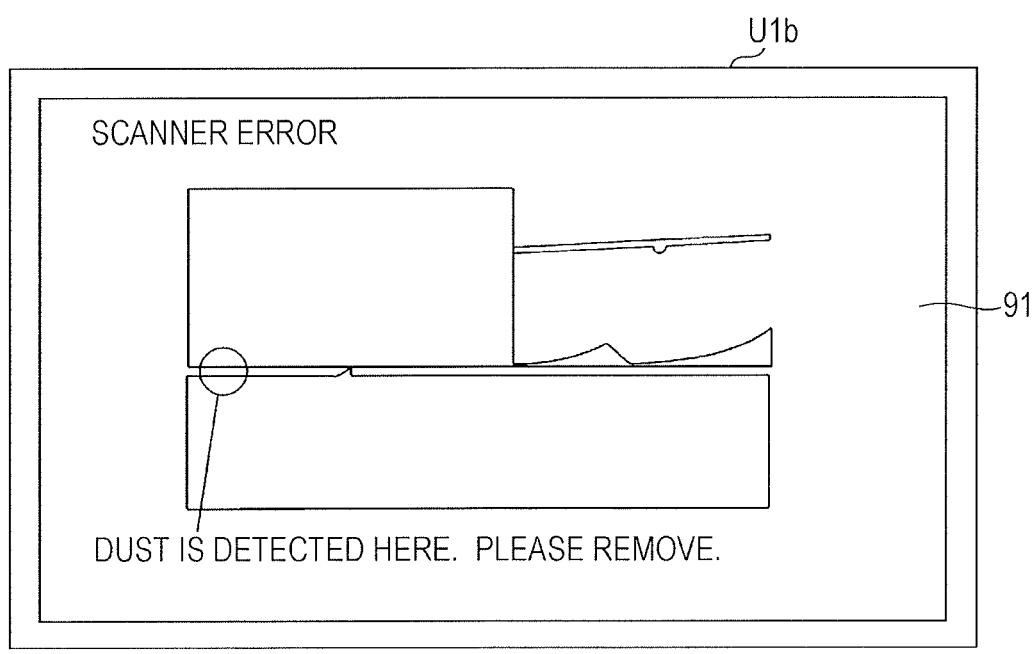
FIG. 6 illustrates an announcement screen according to the first exemplary embodiment.

FIG. 6 illustrates an announcement screen according to the first exemplary embodiment.

C12: Announcement Screen Display

An announcement screen display C12 displays, on the display section UIb, an announcement screen that announces the presence of removal-target dust in the case where it is determined that removal-target dust is present between the first image reading position P1 and the upstream position P2. The announcement screen display C12 according to the first exemplary embodiment displays, on the display section UIb, an announcement screen 91 illustrated in FIG. 6 in the case where the removal-target dust determination unit C11B determines that removal-target dust is present.

C13: Document Transport Controller

A document transport controller C13 controls drive of the document handling roller 41, the document transport roller 43, and so forth via the transport roller drive circuit D2.

The document transport controller C13 according to the first exemplary embodiment drives the document handling roller 41, the document paper exit roller 43, and so forth in the case where the timing to transport the document Gi has come. That is, the document transport controller C13 transports the document Gi through the document transport path GH. In the case where the removal-target dust determination unit C11B determines that removal-target dust is present, in addition, the document transport controller C13 holds the document handling roller 41, the document transport roller 43, and so forth stationary not to start drive. That is, the document transport controller C13 stands by without starting transport of the document Gi to the document transport path GH.

(Flow Diagram According to First Exemplary Embodiment)

Next, the flow of control in the copier U according to the first exemplary embodiment will be described with reference to a flow diagram, or a so-called flowchart.

(Flowchart of Image Reading Process)

Figure 7:
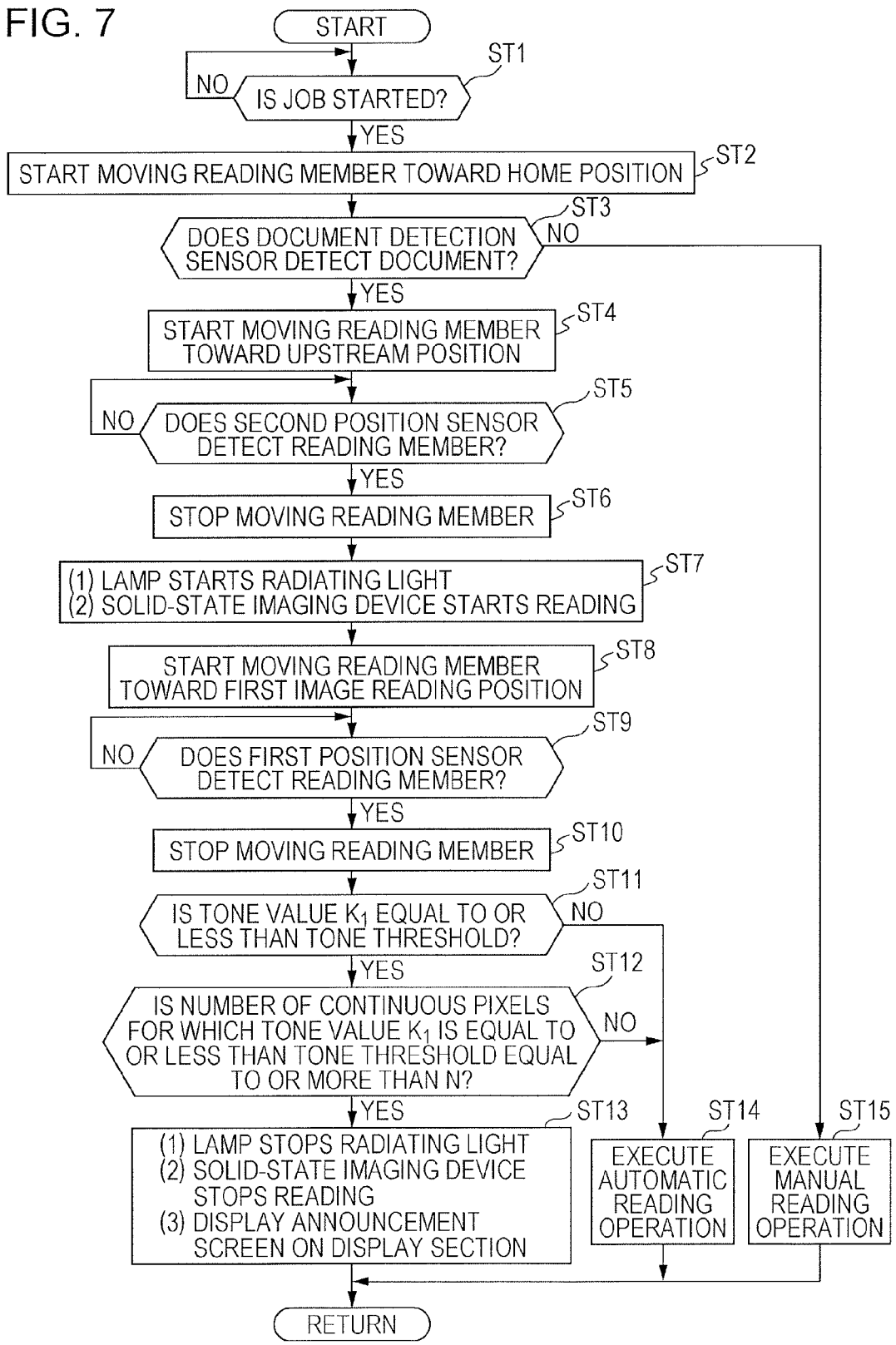
FIG. 7 is a flowchart illustrating an image reading process according to the first exemplary embodiment.

FIG. 7 is a flowchart illustrating an image reading process according to the first exemplary embodiment.

Processes in steps ST of the flowchart of FIG. 7 are performed in accordance with a program stored in the control section C of the copier U. In addition, the processes are executed concurrently with other various processes of the copier U.

The flowchart illustrated in FIG. 7 is started by turning on the copier U.

In ST1, it is determined whether or not a job has been started. If yes (Y), the process proceeds to ST2. If no (N), the process repeats ST1.

In ST2, the reading member 11 is moved toward the home position P0. Then, the process proceeds to ST3.

In ST3, it is determined whether or not the document detection sensor 38 has detected the document Gi. If yes (Y), the process proceeds to ST4. If no (N), the process proceeds to ST15.

In ST4, the reading member 11 is moved toward the upstream position P2. Then, the process proceeds to ST5.

In ST5, it is determined whether or not the second position sensor SN2 has detected the reading member 11. If yes (Y), the process proceeds to ST6. If no (N), the process repeats ST5.

In ST6, movement of the reading member 11 is stopped. Then, the process proceeds to ST7.

In ST7, the following processes (1) and (2) are executed, after which the process proceeds to ST8.
(1) The lamp La starts radiating light.
(2) The solid-state imaging device CCD starts reading.

In ST8, the reading member 11 is moved toward the first image reading position P1. Then, the process proceeds to ST9.

In ST9, it is determined whether or not the first position sensor SN1 has detected the reading member 11. If yes (Y), the process proceeds to ST10. If no (N), the process repeats ST9.

In ST10, movement of the reading member 11 is stopped. Then, the process proceeds to ST11.

In ST11, it is determined whether or not the tone value $K_1$ is equal to or less than the tone threshold $K_a$. If yes (Y), the process proceeds to ST12. If no (N), the process proceeds to ST14.

In ST12, it is determined whether or not the number of pixels for which the tone value $K_1$ is equal to or less than the tone threshold $K_a$ and which are continuous in the main scanning direction or the sub scanning direction is equal to or more than the size threshold N. If yes (Y), the process proceeds to ST13. If no (N), the process proceeds to ST14.

In ST13, the following processes (1) to (3) are executed, after which the process returns to ST1.

(1) The lamp La finishes radiating light.
(2) The solid-state imaging device CCD finishes reading.
(3) The display section UIb displays the announcement screen 91.

In ST14, automatic reading operation is executed. Then, the process returns to ST1.

In ST15, manual reading operation is executed. Then, the process returns to ST1.

(Effect of Document Image Reading Process)

In the copier U according to the first exemplary embodiment configured as described above, if the document Gi is not provided in the document feed tray U1a1 when the copy start key UIc is pressed, "manual reading operation" is executed. If the document Gi is provided in the document feed tray U1a1, "automatic reading operation" is executed.

In the first exemplary embodiment, in the case where "automatic reading operation" is to be executed, the reading member 11 starts moving toward the first image reading position P1 after moving to the upstream position P2 before the document Gi is transported through the document transport path GH, that is, with the document Gi not provided on the document passage surface PG1.

When the reading member 11 starts moving toward the first image reading position P1, the lamp La is turned on to start radiating light. Then, radiated light radiated from the lamp La is reflected by the guide reflecting plate 52, passes through the document passage surface PG1, and forms an image on the imaging member 21 via the reflecting plates 12b, 13a, and 13b, etc. to be read by the solid-state imaging device CCD. The solid-state imaging device CCD reads light reflected by the guide reflecting plate 52 while the reading member 11 is moving from the upstream position P2 toward the first image reading position P1. Hence, the amount of reflected light from the guide reflecting plate 52 is read in a region between the upstream position P2 and the first image reading position P1.

In the case where dust such as a paper fragment, paper powder, and dust adheres to the document passage surface PG1 or the guide reflecting plate 52, radiated light from the lamp La may be irregularly reflected by the dust or absorbed by the color of the dust. Thus, the amount of reflected light from the dust may be smaller than the amount of light reflected by the guide reflecting plate 52. Hence, with the configuration according to the first exemplary embodiment, it is possible to determine that dust is present in the case where there is any tone value $K_1$ for each pixel that is computed on the basis of the read amount of reflected light and that is equal to or less than the tone threshold $K_a$.

Figure 8A:
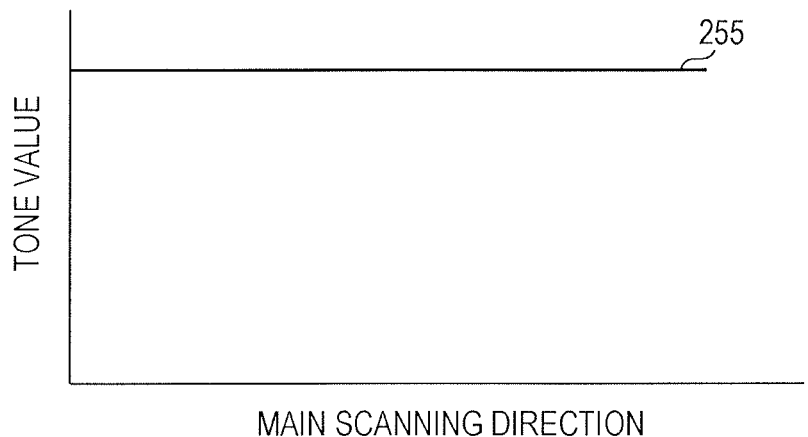
FIG. 8A is a graph illustrating a detected value of reflected light detected by a solid-state imaging device without the presence of dust to illustrate the effect of the first exemplary embodiment, in which the vertical axis represents the tone value and the horizontal axis represents the main scanning direction.
Figure 8B:
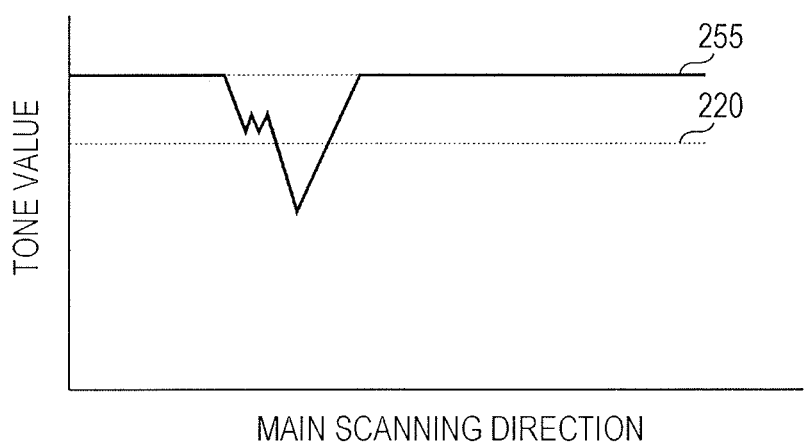
FIG. 8B is a graph illustrating a detected value of reflected light detected by the solid-state imaging device with the presence of dust to illustrate the effect of the first exemplary embodiment, in which the vertical axis represents the tone value and the horizontal axis represents the main scanning direction.

FIG. 8A is a graph illustrating a detected value of reflected light detected by the solid-state imaging device without the presence of dust to illustrate the effect of the first exemplary embodiment, in which the vertical axis represents the tone value and the horizontal axis represents the main scanning direction. FIG. 8B is a graph illustrating a detected value of reflected light detected by the solid-state imaging device with the presence of dust to illustrate the effect of the first exemplary embodiment, in which the vertical axis represents the tone value and the horizontal axis represents the main scanning direction.

Specifically, in the configuration according to the first exemplary embodiment, the tone value $K_1$ for each pixel is computed for each line that extends in the main scanning direction in the case where "automatic reading operation" is executed. In the case where the read tone value $K_1$ is equal to or more than "220" which is the tone threshold $K_a$ for all the pixels as illustrated in FIG. 8A, it is determined that dust is not present on the line. In the case where the tone value $K_1$ is less than "220" for some of the pixels as illustrated in FIG. 8B, meanwhile, it is determined that dust is present on the line.

In addition, the guide reflecting surface 52a is provided on the lower surface of the guide reflecting plate 52 according to the first exemplary embodiment, and radiated light radiated from the lamp La is regularly reflected by the guide reflecting surface 52a. Hence, a sufficient amount of reflected light to be read by the solid-state imaging device CCD is secured. In the case where a reference plate according to the related art is used, the difference between data for "white" of the reference plate and data for "white" of paper is small compared to the configuration according to the first exemplary embodiment. Thus, with the related art, the difference, or so-called contrast, between the reference plate and paper may be so small that paper may not be detected. With the configuration according to the first exemplary embodiment, in contrast, the contrast between the reference plate and paper is large compared to the configuration according to the related art, which improves the accuracy in determining the presence or absence of dust.

In the configuration according to the first exemplary embodiment, in addition, dust is detected not only at the first image reading position but also in the reading region E1 including the first image reading position. If dust is detected at plural locations in the sub scanning direction using a white reference plate as in the configuration according to the related art, data for "white" differ among the locations because of differences in stain on the white reference plate and distance between the white reference plate and the solid-state imaging device CCD. Hence, data for "white" are required for each location, which may increase the amount of data.

With the configuration according to the first exemplary embodiment, in contrast, light is regularly reflected by the guide reflecting surface 52a which is a mirror surface, and an amount of light that sufficiently exceeds the reference value $V_0$ corresponding to the upper limit value may be received at any position in the range of the reading region E1.

Hence, data that serve as a criterion for determination such as data for "white" are not required for each location, which makes it possible to detect dust that is present in a region other than the first image reading position P1 without increasing the amount of data.

If dust such as a paper fragment or a clip is present in the vicinity of the first image reading position P1 in the case where "automatic reading operation" is executed, the document Gi being transported may be stuck to cause a jam, or the document Gi may be torn.

At the first image reading position P1, in particular, the gap between the reading guide 51 and the document passage surface PG1 is narrower than that on the upstream side and the downstream side of the first image reading position P1 in the document transport direction because of the focal length of the solid-state imaging device CCD. Thus, the gap between the reading guide 51 and the document passage surface PG1 becomes narrower from the upstream position P2 toward the first image reading position P1. Hence, if dust such as a paper fragment is present at the narrow location upstream of the first image reading position P1 in the document transport direction, the document Gi may be easily stuck on the dust to easily cause a jam in the first document transport path GH1.

In the case where the dust is a large toner stain or ink stain, meanwhile, the document Gi being transported may be stained. In the case where the dust is a toner stain or large dust, and if the stain is spread or the dust moves to the first image reading position P1, such a stain or dust may intrude between the document passage surface PG1 and the document Gi to cause a document image reading failure in which the stain or dust appears in the read image. That is, if dust is present upstream of the first image reading position P1 in the document transport direction, the dust may be pushed by the document being transported to the first image reading position P1 to appear in the image. With the configuration according to the related art in which dust is detected only on the downstream side of the image reading position in the document transport direction, such an issue may not be addressed.

With the configuration according to the first exemplary embodiment, in contrast, it is possible to detect dust in a region between the first image reading position P1 and the upstream position P2 on the basis of the amount of reflected light read when "automatic reading operation" is executed. When dust is detected, the document Gi is not transported. Thus, it is possible to reduce contact between the document Gi and dust compared to the configuration according to the related art in which dust is not detected in a region between the first image reading position P1 and the upstream position P2 when "automatic reading operation" is executed.

Thus, it is possible to reduce a jam caused with the document Gi stuck on a paper fragment, a clip, or the like and tear of the document Gi in a region with a narrow gap between the first image reading position P1 and the upstream position P2, and to reduce a stain on the document Gi due to a toner stain or an ink stain.

In the scanner section U1 according to the first exemplary embodiment, even if dust such as dust is present in a region between the first image reading position P1 and the home position P0, the document Gi being transported contacts the dust, and the dust is pushed downward of the first image reading position P1 in the document transport direction. Hence, dust hardly intrudes to the first image reading position P1. Hence, image reading is less adversely affected in the case where dust is present downstream of the first image reading position P1 than in the case where dust is present upstream of the first image reading position P1.

In the scanner section U1 according to the first exemplary embodiment, in addition, the second document transport path GH2 is curved upward from a location downstream of the first image reading position P1. Hence, the document Gi is transported apart from the document passage surface PG1 after passing through the first image reading position P1. Thus, even if a clip, a staple, or the like is present in a region between the first image reading position P1 and the home position P0, an image surface of the document Gi transported through the document transport path GH2 is less likely to be rubbed by the clip or the like to be torn. Hence, execution of "automatic reading operation" is less adversely affected in the case where dust is present downstream of the first image reading position P1 in the document transport direction than in the case where dust is present upstream of the first image reading position P1.

Thus, with the configuration according to the first exemplary embodiment, it is possible to detect dust that is present upstream of the first image reading position P1 and that easily adversely affects "automatic reading operation" compared to the configuration according to the related art in which dust is detected only downstream of the image reading position.

In addition, it is also possible to reduce spread of a stain and movement of dust to the first image reading position P1 from the upstream side in the document transport direction along with transport of the document Gi.

Hence, it is possible to reduce an image reading failure in which a stain or dust appears in the read image, which improves the image quality of the read image. In the configuration according to the first exemplary embodiment, in particular, "automatic reading operation" is interrupted in the case where the dust is removal-target dust which is large dust for which the number of pixels that are continuous in the main scanning direction or the sub scanning direction and that have a detected value that is equal to or less than the tone threshold $K_a$ is equal to or more than N.

In the case where the dust is fine dust or a small toner stain, it is less likely that the document Gi causes a jam. If the dust moves to the first image reading position P1 to appear in the image, the read image may be analyzed to remove the dust through image processing according to the related art. Such image processing is known in the art, may be implemented through a variety of configurations according to the related art, and therefore is not described in detail. Hence, in the first exemplary embodiment, "automatic reading operation" is not stopped in the case where the dust is relatively small.

In the configuration according to the related art in which the size of dust is not determined, "automatic reading operation" is interrupted each time dust is detected irrespective of the size of the dust. Thus, "automatic reading operation" is interrupted even in the case where there is a low possibility that the document Gi causes a jam, which may significantly reduce the productivity.

In the scanner section U1 according to the first exemplary embodiment, in contrast, "automatic reading operation" is interrupted in the case where the detected dust is removal-target dust which is relatively large, and "automatic reading operation" is executed in the case where the detected dust is relatively small. Thus, with the configuration according to the first exemplary embodiment, it is possible to improve the productivity by reducing the number of times when "automatic reading operation" is stopped because of dust in the case where "automatic reading operation" is executed.

In the configuration according to the first exemplary embodiment, in addition, in the case where the detected dust is removal-target dust, "automatic reading operation" is interrupted, and an error indication is displayed on the display section U1b. Specifically, it is announced, as illustrated in FIG. 6, that there is removal-target dust in a region between the upstream position P2 and the first image reading position P1, and that the document transport device U1a should be opened with respect to the document platen PG to remove the removal-target dust. Thus, the possibility that the user forgets to remove the dust is reduced compared to a case where such an announcement is not made. Thus, detected dust such as a paper fragment, a clip, a toner stain, an ink stain, and large dust is easily removed before the document Gi is transported to a region between the first image reading position P1 and the upstream position P2.

(Modifications)

While an exemplary embodiment of the present invention has been described in detail above, the present invention is not limited to the exemplary embodiment, and various modifications may be made without departing from the scope and spirit of the claims. Modifications (H01) to (H016) of the present invention will be described below.

(H01) In the exemplary embodiment, the copier U is described as an example of an image forming device. However, the present invention is not limited thereto, and may be applied to a facsimile, a multi-function machine provided with functions of plural devices, and so forth. The present invention is not limited to an electrophotographic image forming device, and may also be applied to an image forming device of any image forming scheme such as printers of an inkjet recording type, a thermal head type, and a lithographic printing type. The present invention is not limited to a multi-color developing image forming device, and may also be applied to a so-called monochrome image forming device. The present invention is not limited to an image forming device of a so-called tandem type, and may also be applied to an image forming device of a rotary type or the like.

(H02) In the exemplary embodiment, the scanner section U1 is described as an example of an image reading device provided in the copier U which serves as an example of an image forming device. However, the present invention is not limited thereto, and the present invention may also be applied to the scanner section U1 alone, for example.

(H03) In the exemplary embodiment, it is desirably determined whether or not the detected dust is removal-target dust in the case where dust is detected in a region between the first image reading position P1 and the upstream position P2. However, the present invention may also be applied to a configuration in which removal-target dust is not determined even if dust is detected, that is, a determination is made using only the tone threshold $K_a$ without using the number N of continuous pixels.

(H04) In the exemplary embodiment, dust is detected during movement from the upstream position P2 to the first image reading position P1. However, the present invention is not limited thereto, and dust may be detected during movement from the first image reading position P1 to the upstream position P2. In addition, the present invention is not limited to a configuration in which dust is detected between the first image reading position P1 and the upstream position P2, and may also be applied to a configuration in which dust is detected between the upstream position P2 and the home position P0, or between a position downstream of the home position P0 in the document transport direction and the upstream position P2.

(H05) In the exemplary embodiment, the scanner section U1 is capable of executing "automatic reading operation" and "manual reading operation". However, the present invention is not limited thereto, and the movable range of the reading member 11 may be limited to a range between the home position P0 and the upstream position P2, for example, so that the scanner section U1 is capable of executing only "automatic reading operation".

(H06) In the exemplary embodiment, the scanner section U1 is capable of reading images on both surfaces of the document Gi through the solid-state imaging device CCD and the image reading sensor 58 when "manual reading operation" is executed. However, the present invention is not limited thereto, and the scanner section U1 may be configured with the image reading sensor 58 omitted so that only the first surface of the document Gi is read through the solid-state imaging device CCD.

(H07) In the exemplary embodiment, the position sensors SN1 and SN2 are disposed in order to detect the reading member 11 which has been moved to the first image reading position P1 and the upstream position P2, respectively. However, the present invention is not limited thereto. For example, movement of the reading member 11 may be controlled by determining the position of the reading member 11 on the basis of the time elapsed since the reading member 11 starts moving from the home position P0 toward the upstream position P2 using a timer that serves as a time measuring member and without using the position sensors SN1 and SN2.

(H08) In the exemplary embodiment, the guide reflecting plate 52 is inclined so as to reflect radiated light from the lamp La toward the reflected light reflecting plate 12b. However, the present invention is not limited thereto. For example, the guide reflecting plate 52 may be inclined so as to reflect light from the illumination light reflecting plate 12a toward the reflected light reflecting plate 12b.

(H09) In the exemplary embodiment, any light source known in the art may be used in place of the lamp La. For example, a light emitting diode (LED) light source or an organic electro luminescence (EL) light source according to the related art may also be used.

(H010) In the exemplary embodiment, the light-exposure optical system A is composed of the imaging member 21, the reflected light reflecting plate 12b, the first reflecting plate 13a, and the second reflecting plate 13b. However, the present invention is not limited thereto, and any configuration known in the art may also be adopted. For example, a reflection unit of any configuration that differs from the reflection unit 13 in number or shape of reflecting members to be used may also be adopted. That is, in the first exemplary embodiment, the guide reflecting plate 52 indirectly reflects light toward the solid-state imaging device CCD via the light-exposure optical system A. However, the guide reflecting plate 52 may directly reflect light toward the solid-state imaging device CCD.

(H011) In the exemplary embodiment, the number N of pixels that are continuous in the main scanning direction or the sub scanning direction and that have a detected value that is equal to or less than the tone threshold $K_a$ is stored as the size threshold which serves as an example of a second threshold. However, the present invention is not limited thereto. For example, a region of pixels of N (pixels)×N (pixels), N×M, or the like that are continuous in the main scanning direction and the sub scanning direction and that have a detected value that is equal to or less than the tone threshold $K_a$ may also be stored as the size threshold. The numbers N and M of pixels may be changed to any value in accordance with the design, specifications, or the like.

(H012) In the exemplary embodiment, the reflected light detected value "220" is stored as the tone threshold $K_a$ which serves as an example of a threshold for determining the presence of absence of dust. However, the present invention is not limited thereto, and the tone threshold may be changed to any value in accordance with the design, specifications, or the like.

(H013) In the exemplary embodiment, the guide reflecting surface 52 is desirably provided with the guide reflecting surface 52a which serves as an example of a reflecting surface that regularly reflects radiated light from the lamp La. However, the present invention is not limited thereto, and the guide reflecting plate 52 may be installed at an angle that is different from the angle for regular reflection if a sufficient amount of light may be secured.

(H014) In the exemplary embodiment, the guide reflecting surface 52a is described as an example of a reflecting surface with a difference from the amount of light reflected from the document Gi is larger than the difference in amount of light set in advance. However, the present invention is not limited thereto. For example, the guide reflecting surface 52a may be colored in black or the like to increase the difference from the amount of light reflected from the document Gi. Besides, a specific image that enables detection of a blockage by dust such as a paper fragment, e.g. an image in which minute dots that are invisible to human eyes, or so-called stealth dots, are distributed irregularly, may be formed on the reflecting surface.

(H015) In the exemplary embodiment, dust is detected in the reading region E1 which is located between the first image reading position P1 and the upstream position P2 in the document transport direction. However, the present invention is not limited thereto. For example, dust may be detected at a position that is set downstream of the first image reading position P1 in the sub scanning direction and that is different from the first image reading position P1, and dust may also be detected in a region including the first image reading position P1 and set upstream and downstream of the first image reading position P1 in the sub scanning direction.

(H016) In the exemplary embodiment, dust is detected in the entire reading region E1. However, the present invention is not limited thereto. For example, dust may also be detected at two or more plural positions at intervals set in advance.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a transport path configured to transport a document;
   a reading member configured to read an image of the document at a reading position set in advance on the transport path, the reading member including a light source that is movable with respect to the reading position in a sub scanning direction which extends along a document transport direction and being capable of reading at a plurality of positions in the sub scanning direction;
   a reflecting member that has a reflecting surface that faces the reading member over a range that includes the reading position and that extends to a position that is different from and upstream of the reading position in the sub scanning direction, a difference between an amount of light reflected from the reflecting surface and an amount of light reflected from the document being set to be larger than a difference in amount of light set in advance;
   a movement controller configured to control the reading member so as to move the light source with respect to the reading position before the document is transported to the reading position in a case where the reading member reads the image of the document;
   a dust determination unit configured to determine presence of dust upstream of the reading position on a basis of an image read when the light source is moved; and
   an announcement member configured to announce a presence of dust to a user in response to the dust determination unit determining that dust is present,
   wherein the transport path is provided between the reflecting member and the reading member, and
   wherein the reading position is predetermined before determining the presence of dust upstream of the reading position and before the document is transported by the transport path.

2. The image reading device according to claim 1, further comprising:
   an opposing member configured to regularly reflect light from the light source.

3. The image reading device according to claim 1,
   wherein the movement controller is configured to move the light source between the position, set upstream of the reading position in the document transport direction, and the reading position, and
   wherein the dust determination unit is configured to determine whether or not dust is present between the position and the reading position on a basis of an image read when the light source is moved between the position and the reading position.

4. The image reading device according to claim 1,
   wherein the dust determination unit is configured to, in response to the dust determination unit determining that dust is present, determine, on a basis of a size of the dust in at least one of a main scanning direction and the sub scanning direction in the read image, whether or not the dust has a size set in advance or more, and
   wherein the image reading device further includes a document transport controller configured to stop transport of the document in response to the determining unit determining that the dust has the size set in advance or more.

5. The image reading device according to claim 1, wherein the reading member further includes a reflecting plate positioned at an opposite side of the reading member than the light source in the sub scanning direction,
   the reflecting plate faces both of the reflecting member and the light source and is configured to reflect light between the light source and the reflecting member.

6. The image reading device according to claim 5, further comprising:
   a first sensor configured to detect that the reading member is positioned such that a second reflecting plate of the reading member aligned with the reading position in the sub-scanning direction, and
   a second sensor, arranged upstream of the first sensor, and configured to detect that the reading member is positioned such that the second reflecting plate is aligned with the position in the sub-scanning direction, wherein the second reflecting plate is configured to reflect light that is reflected from the reflecting plate and the reflecting surface along a light detection path along which the image is read.

7. An image forming device comprising:
   the image reading device according to claim 1, wherein the image reading device is configured to read an image; and
   an image recording device configured to record the image read by the image reading device in a medium.

* * * * *